United States Patent [19]

Waters

[11] Patent Number: 5,695,284

[45] Date of Patent: Dec. 9, 1997

[54] THAW INDICATOR UNIT AND METHOD OF MANUFACTURE

[76] Inventor: Gary H. Waters, 248 Royal Dr., Kingsport, Tenn. 37663

[21] Appl. No.: 695,478

[22] Filed: Aug. 12, 1996

Related U.S. Application Data

[63] Continuation of Ser. No. 263,514, Jun. 22, 1994, abandoned.

[51] Int. Cl.[6] ............................................ G01K 11/06
[52] U.S. Cl. .......................... 374/162; 374/106; 116/207; 116/217; 426/88
[58] Field of Search .............................. 116/206, 207, 116/216–219; 374/160–162, 106; 426/87, 88

[56] References Cited

U.S. PATENT DOCUMENTS

| | | | |
|---|---|---|---|
| 3,047,405 | 7/1962 | Lanier | 374/106 |
| 3,090,236 | 5/1963 | Nicol | 116/217 |
| 3,220,259 | 11/1965 | Beyer | 116/217 |
| 3,243,303 | 3/1966 | Johnson | 116/207 |
| 3,768,976 | 10/1973 | Hu et al. | 116/217 |
| 4,051,804 | 10/1977 | Garnett | 116/219 |
| 4,145,918 | 3/1979 | Couch et al. | 116/217 |
| 4,154,106 | 5/1979 | Inoue et al. | 116/207 |
| 4,647,224 | 3/1987 | Holm et al. | 374/162 |
| 4,664,056 | 5/1987 | Jehanno | 116/217 |
| 5,301,632 | 4/1994 | Cayol et al. | 116/217 |

FOREIGN PATENT DOCUMENTS

| | | | |
|---|---|---|---|
| 2611899 | 9/1988 | France | 374/162 |
| 2237844 | 7/1973 | Germany | 374/162 |
| 4031792 | 4/1991 | Germany | 116/206 |

*Primary Examiner*—Diego F. F. Gutierrez
*Assistant Examiner*—Andrew Hirshfeld

[57] ABSTRACT

A thaw indicator unit for sensing and permanently recording a thawing event experienced by a temperature sensitive food or other item, the unit having a container of transparent, non-toxic material, and having a hermetically sealed chamber containing a frozen color change medium having at least two segments of differently colored frozen aqueous compositions, the segments being juxtaposed along an interface of molecular thickness, and at least one of the segments being substantially homogeneously colored differently from at least one juxtaposed other colored segment, wherein the colorants are food grade materials, and whereby the unit when placed on, in or in close proximity to the item will record any first thawing event by way of thawing of the juxtaposed segments and intermixing thereof at least at the interface thereof to produce at least a visible section of an intermix of said compositions and having a markedly different and readily visible color from that of the juxtaposed segments.

12 Claims, 1 Drawing Sheet

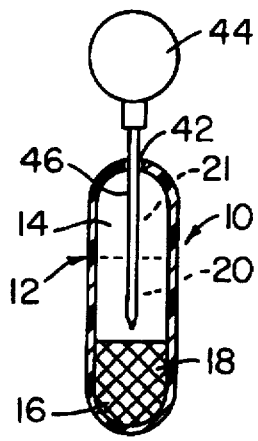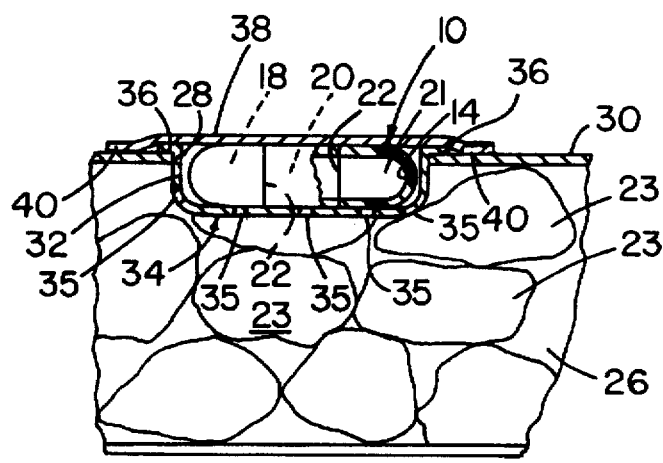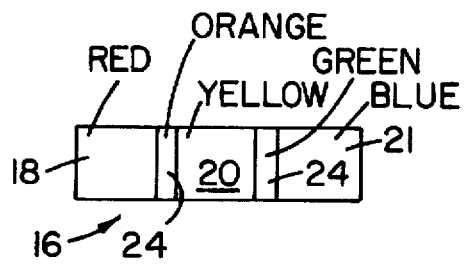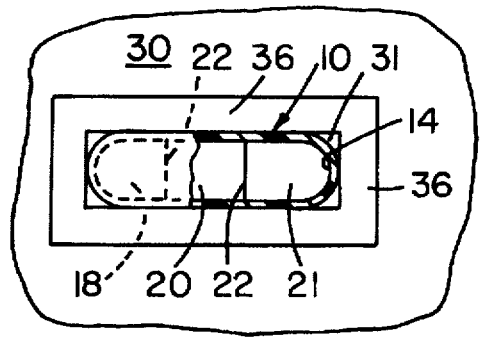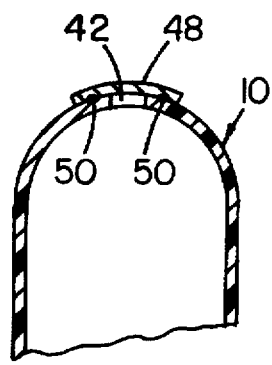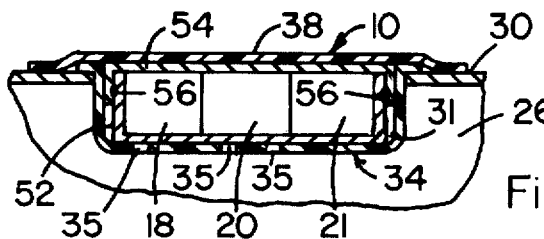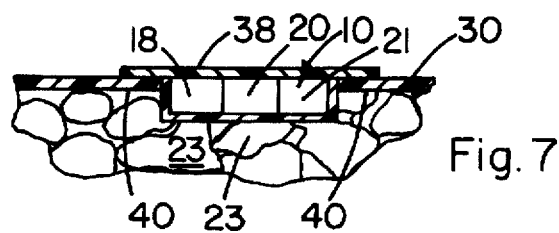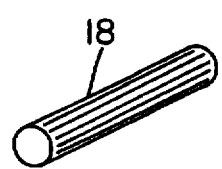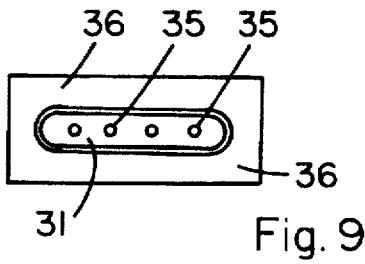

THAW INDICATOR UNIT AND METHOD OF MANUFACTURE

This application is a continuation of Ser. No. 08/263,514 filed Jun. 22, 1994, now abandoned, and the invention concerns a device which is to be used in connection with perishable food goods or other temperature sensitive products or materials, hereinafter "item", wherein an extensive or complete thaw or a partial thaw of frozen item will be recorded permanentaly in a substrate which is highly visible, particularly to the consuming pulic.

The United States has the safest consumer processed foods in the world, due largely to extensive monitoring, inspection and enforcement of food processing, storage and handling regulations by the FDA and USDA, and by the commitment of U.S. food processing manufactures to high sanitation and quality assurance standards.

One significant cause of food-born illness is the mishandling of frozen processed food such as chicken, turkey, seafood, beef, pork, lamb, dairy products, eggs, vegetables, or the like during the distribution process. This mishandling is due in large measure, to the fact that processors typically have little or no control of their products after they leave the manufacturing facility. Furthermore, it is impossible for governmental regulatory agencies to effectively monitor the distribution process, other than through "spot-checking" screens or the like.

Heretofore, various devices have been employed to record a thaw or defrost event with regard to food products or other temperature sensitive items. These devices are shown in the following U.S. Pat. Nos. 4,144,834; 5,267,794; 4,280,361; 4,163,427; 4,114,443; 4,120,818; 3,233,459; 4,038,936; 3,786,777; 3,702,077. These devices have not proven entirely satisfactory due either to difficiencies their visual perceptual character, or in the danger of their use, or in their sensitivity to thawing conditions, or in their complexity of manufacture or use. Also, such prior indicators or devices typically employ membranes, frangible discs, capsules or balls which must be ruptured by freezing to activate the device. The shortcomings of such devices is that they often fail in practice. For example:

1. encapsulation processes housing the indicator or reagent often fail to rupture on freezing;
2. encapsulation processes housing the indicator or reagent rupture prematurely, spilling contents and thus producing a false result;
3. the temperature monitoring device, for some reason, never reaches the freezing point and consequently is never activated, thus producing a false result.

A principal object, therefore, of the present invention is to provide a readily manufacturable, inexpensive, easy to use, safe, highly thaw sensitive and highly visible thaw indicator unit for use with perishable or temperature sensitive goods.

This and other objects hereinafter appearing have been attained in accordance with the present invention through the discovery of a thaw indicator unit for sensing and permanently recording a thawing event experienced by a temperature sensitive food or other item, said unit comprising containment means of transparent, non-toxic material, and having a hermetically sealed chamber containing a frozen color change medium having at least two segments of colored frozen aqueous composition within said chamber juxtaposed along an interface, and at least one of said segments being substantially homogeneously colored differently from at least one juxtaposed other colored segment, wherein the colorants are food grade materials, and whereby said unit when placed on, in or in close proximity to said item will record any first thawing event by way of thawing of said juxtaposed segments and intermixing thereof at least at said interface to produce at least a visible section of colored aqueous composition having a markedly different and readily visible color from that of either of said juxtaposed segments.

In certain preferred embodiments:

(a) said segments are differently colored red, yellow and blue such that substantial thawing of said medium will produce highly visible black;

(b) said medium comprises a linear, progressive array of red to yellow to blue juxtaposed segments such that partial thawing thereof will be evidenced by visible sections of orange and green colors;

(c) the freezing points of the compositions of said segments are adjusted with food grade salt material to be substantially identical;

(d) said segments are in rectangular or rod shaped form; and (e) the method of preparing a frozen, color change medium for a thaw indicator unit to be affixed to a food item or package, comprising providing at least two frozen adjacent segments of differently colored aqueous composition in juxtaposed relationship in an open container having a substantially transparent region overlying at least the section of juxtaposition of said segments, while maintaining the frozen condition of said segments, hermetically sealing said container in a manner whereby said frozen segments are maintained in said juxtaposed relationship, and maintaining the frozen condition of said segments throughout the period prior to affixation of said unit to said food item or package containing the same.

The present indicator unit has been developed to assure that frozen food products have not thawed prior to reaching the consumer. Bacteriological growth from thawing and refreezing of certain food products can have serious detrimental health consequences to the consuming public, as well as resulting in liability to the manufacture and/or seller. The simplicity of the above described unit makes the concept affordable to any quality conscience manufacturer or frozen food products. The high degree of accuracy and reliability achievable by the present invention promotes a unique program of quality assurance and safety for the consuming public.

Incorporation of the present indicator unit onto or into the packaging of frozen food products, which unit changes color in a dramatic and highly visible manner if the product is subjected to thawing or partially thawing conditions, would visually warn that thawing conditions had existed during the shipping and/or handling process and that the product should not be consumed.

The present indicator unit is an irreversible temperature indicator that can be made in a variety of sizes and shapes end provided with color change media wherein the freezing points have been adjusted such that each segment will thaw at the exact temperature of thaw of the other segments and which is suitable for any environment to be monitored. Examples of environments include cold storage areas or warehouses, transportation trailers/cubes, commercial or grocery store freezers, and residential freezers and refrigerator freezing compartments. Additionally, packaged food could be effectively monitored from the initial time of freezing at the processor, through the storage/transportation/handling process and eventually to the end user or consumer. Examples of such utilization include: on outer surfaces of individual pallets of packaged frozen food, to monitor for possible heat shock; on outer surfaces of cases of frozen packaged food, to monitor for possible heat shock; on outer surfaces of individual packages of frozen food, to monitor for possible heat shock; or most importantly, to accurately monitor the internal environment temperature of frozen packaged food.

Examples of such use are:

(a) through a clear, transparent plastic window with the unit attached thereto and visible on the inside of the window open to food stuff as shown in FIG. 7;

(b) through a clear, transparent plastic window with the unit visually contained within a recessed white or lightly colored receptacle closed to food stuff as shown in FIG. 2; and (c) through a clear, transparent plastic window with the unit visually contained and attached within a recessed white or lightly colored receptacle as shown in FIG. 2, wherein said chamber is partially open to the food stuff, e.g., by a plurality of apertures 35 through the wall of the receptacle.

BRIEF DESCRIPTION OF THE DRAWINGS

Further objects and advantages of the present invention will become evident from the drawing and description of preferred embodiments wherein:

FIG. 1 depicts a preferred embodiment of the present indicator device with two segments not yet formed and indicated by a dotted line, and the method used to prepare the same;

FIG. 2 shows a cross-section of a ready-to-use carton of food with the present indicator device in place thereon and shown partially in cross-section;

FIG. 3 is a top view of the carton of FIG. 2 with the top protective cover removed for purposes of clarity and the indicator device shown partially in cross-section;

FIG. 4 is a view as in FIG. 2 showing a variation in the shape of the indicator device;

FIG. 5 is a schematic representation of partially thawed indicator device showing preferred segment coloration therefor;

FIG. 6 is a cross-sectional view of the top portion of the indicator device of FIG. 1 showing one means for sealing the fill port;

FIG. 7 is a cross-sectional view as in FIG. 1 showing a variation in construction of the indicator device;

FIG. 8 is an enlarged isometric view of a rod-shaped ice segment; and

FIG. 9 is an enlarged top elevational view of a receptacle means having air circulation vents thru the body wall thereof.

DETAILED DESCRIPTION OF PREFERRED EMBODIMENTS

Referring to the drawings, and with particular reference to the claims hereof, the present indicator device generally designated 10 comprises containment means 12 of transparent, non-toxic material and, e.g., of circular, eliptical or rectangular cross-sectional shape, and providing a hermetically sealed chamber 14 containing a frozen color change medium 16 having at least two segments such as 18, 20, 21 of colored frozen aqueous composition within said chamber juxtaposed along an interface 22, and at least one of said segments being substantially homogeneously colored differently from at least one juxtaposed other colored segment, wherein the colorants are food grade materials, and whereby said unit when placed on, in or in close proximity to a food or other temperature sensitive item 23 will record any first thawing event by way of thawing of said juxtaposed segments and intermixing thereof at least at said interface to produce at least a visible section 24 of colored aqueous composition having a markedly different and readily visible color from that of either of said juxtaposed segments.

The above device is an irreversible temperature monitoring device that works effectively and efficiently regardless of the number of freeze/thaw cycles, including a single thawing/freezing incident. The device is designed to be used in conjunction with and replicate the freezing points of food products being monitored. The freezing point of the medium 16 can be tailored to be exactly the same as the freezing point of food product in storage. A distinct advantage of this unit is the ease of interpretation for partial as well as complete thawing or defrosting. Partial thawing results in a spectrum of additional colors, whereas complete thawing results in a distinctive black color. A single thawing or partial thawing incident will produce a distinct permanent result, regardless or refreezing.

It is noted that if a saline solution or other ingredient is used to adjust the freezing point of each colored solution, each color spectrum or band, i.e., magenta red, clear yellow, and cyan blue, will have the exact same freezing, thawing and defrosting point.

The finished frozen indicator device has a definite color spectrum of approximate magenta red, clear yellow and cyan blue. This finished device must be kept stored at temperatures below the freezing point specified. If temperature is maintained at below specific freezing point, color spectrum will remain unchanged, thus indicating that the critical control point has not been violated. However, if the critical control point has been violated, thawing or defrosting conditions will result and thus produce a color change in the unit. Results can be accurately interpreted in two possible ways:

1. if the color spectrum of the unit is a visible composite of magenta red, orange, clear yellow, green and cyan blue, partial thawing or defrosting conditions have occurred indicating a potentially dangerous temperature infraction;

2. if the color spectrum turns an unmistakable black color, complete thawing or defrosting conditions have occurred indicating a dangerous temperature infraction.

The containment means or vessel 12 is constructed of non-toxic, non-frangilbe, clear, transparent material such as food packaging grade polyolefin, polyester, polyvinyl chloride, cellulose ester, polyamide, or the like and preferably is of sufficient wall thickness, e.g., 4–15 mil., to substantially retain its shape during filling thereof with the color change medium 16. The vessel wall should be sufficiently flexible to withstand expansion and contraction from freezing and thawing. The size and shape of the vessel 12 can be varied, e.g., cylindrical rod shaped, rectangular or capsule shaped, to suit the particular manner in which the unit is to be used. For example, where the unit is to be used by itself, without any supporting structure, and is to be simply inserted into a cavity of, e.g., a frozen turkey, it could be desirable to provide a fairly large and elongated unit for ease of handling and viewing. However, for most uses with packaged food products as shown in FIG. 2, the actual size of the unit need only be about ¾ in., or so in length and about ¼ in., in width since handling of the unit will not be required for assessing the color condition thereof. The vessel should be sterilized using, e.g., the conventional Ethylene-Oxide process, or other processes that meet governmental food grade regulatory standards for packaging, and should be stamped or branded with the exact freezing point temperature. Similarly, all ingredients of the colored solutions and frozen segments, as well as their preparations are food grade, government approved, and biologically safe.

Referring to FIG. 2 which shows a typical usage of the present device, the food item 23, such as frozen chicken nuggets or the like, is contained in a food grade package 26. An opening 28 is provided through a wall of the package, preferably in a highly visible portion such as the top 30 thereof, and the body 32 of a receptacle generally designated 34 is inserted therethrough such that it lies in close proximity or actually contacts the food item 23. This receptacle provides cavity means 31 and may be apertured as at 35 as desired to provide air vents for some air circulation and a more immediate temperature communication between the indicator device and the interior of the food package or the food item itself. A top rim 36 of the receptacle engages the portions of the package top which lie adjacent and form said opening and fixes the position of the receptacle within said opening. The device 10 is then placed within the receptacle and a cover 38 of transparent material, such as described above for vessel 12 and which may be of thinner dimension, e.g., 2–6 mil thickness, is placed tightly over the indicator device 10 and rim 36 of the receptacle preferably adhesively affixed as at 40 to top 30 of the package completely surrounding rim 36 to hermetically seal said device and receptacle within the package.

Referring to FIG. 1 and the steps claimed herein for preparing the indicator device, the general method for the preparation comprises providing at least two frozen adjacent segments such as 18, 20, 21 of differently colored aqueous composition in juxtaposed relationship in an open container 12, said container having a substantially transparent region overlying at least the section of juxtaposition 24 of said segments, while maintaining the frozen condition of said segments hermetically sealing said container 12 in a manner whereby said segments are maintained in said juxtaposed relationship, and maintaining the frozen condition of said segments throughout the period prior to affixation of said unit to a food item 23 or package 26 containing the same.

In a preferred embodiment of the method as shown in FIG. 1, the segments 18, 20, 21 are successively entered as liquid and successively frozen, one on top of the other, in said vessel 12, whereby each juncture thereof will provide an interface 22 of molecular thickness such that the slightest thaw of the segments will be evidenced by a color change within the region of diffusion 24 at each said interface. An interface of molecular thickness is defined as an interface between adjacent segments wherein the molecules of the segments are molecularly bonded together. The operations of entering the different colored solutions, preferably red for segment 18, yellow for segment 20, and blue for segment 21, into vessel 12 are readily accomplished by providing an entry port 42 through the top of the vessel and by using separate squeeze bulbs 44 and pipettes 46 inserted through said port for injecting the different colored solutions progressively into the vessel. In carrying out these operations, the red solution for segment 18 is first introduced and frozen very solid. The yellow solution for segment 20 is then introduced at essentially freezing temperatures, e.g., 31.8° F., on top of frozen segment 18, and then, when segment 20 is frozen very solid, introducing the blue solution for segment 21 on top of segment 20, again at essentially freezing temperatures. By lowering the temperatures of each solution to near freezing, their introduction on top of the prior hard frozen segment will not result in any visible diffusion of colors across the interface. After the segments are formed within container 12, port 42 is sealed by any known means such as adhesive patch 48 of the same material as used for the container and shown in FIG. 6, wherein the adhesive may comprise a solvent for the material such as to form a solvent weld 50 of the patch to the container in known manner. Such solvent welding is exemplified, for example, in the solvent connections of PVC pipe commonly done in plumbing operations.

In another method, the segments are provided in separately frozen form for placement in said container or vessel, and wherein the container and segments are cooperatively dimensioned such that sealing of the container forcibly maintains the segments in juxtaposed relationship. This method is embodied in FIG. 4 wherein the segments 18, 20, 21 are formed substantially as square or rectangular colored ice cubes and then pressed tightly into a rectangular receptacle body 52 under freezing conditions. A lid 54 is then tightly pressed on over the upper portion of body 52 and adhesive hermetically sealed thereto all around the adjacent surfaces by solvent welding or the like as at 56.

Referring to FIG. 7, the structural combination of the indicator device and its support is simplified in that the device 10 is made as part of the underside of coer 38 or is adhesively secured thereto. This construction eliminates the need for a separate receptacle such as 34 and also places the device into more immediate communication with the actual food item, which thereby enhances the temperature monitoring accuracy of the unit.

The colored solutions should employ pure distilled water, food grade salt for adjusting the freezing points to the same temperature, and the colorants must be edible grade and meet all governmental food grade standards, i.e., U.S. certified F.D. and C. food coloring. The preferably colors used will be three pigment primaries—red, yellow and blue and will approximate the color hues of magenta red, a clear yellow, and cyan blue, thus producing a complete color range or change, evident upon thawing or defrosting. Typical useful colorants are concentrated colors, manufactured by The C.F. Sauer Company, Richmond, Va., and include water, propylene glycol, and U.S. Certified F.D. & C. colorants as follows:

red—Red #40, with traces of Blue #1;

yellow—Yellow #5 with small amounts of Yellow #6 and Red #40;

blue—Blue #1.

These individual colors are diluted with sterilized distilled H₂O to approximate Magenta Red, Clear Yellow and Cyan Blue.

This invention has been described in detail with particular reference to preferred embodiments thereof, but it will be understood that variations and modifications will be effected with the spirit and scope of the invention.

I claim:

1. A thaw indicator unit for sensing and permanently recording a thawing event experienced by a temperature sensitive food item, said unit comprising a containment means of transparent, non-toxic material formed to provide a hermetically sealed chamber containing a frozen color change medium of at least two segments of colored frozen aqueous compositions, each said segment having a surface portion juxtaposed a surface portion of at least one other said segment along an interface, said interface being of molecular thickness, at least one of said segments being substantially homogeneously colored differently from a juxtaposed colored one of said segments, wherein colorants of said segments are food grade materials, and whereby said unit when placed on, in or in close proximity to said item will record any first thawing event by way of thawing of said juxtaposed segments and intermixing thereof at least at said interface to produce at least a visible section of an intermix of said compositions, said visible section having a markedly different and readily visible color from that of said juxtaposed segments, receptacle means formed to provide cavity means for receiving and retaining said containment means, said receptacle means being adapted for insertion through aperture means formed through a food package wall or into an unfrozen food item, said receptacle means having rim means adapted to bear against either said wall or said item, and cover means of transparent material adapted to cover over said unit and be secured to a surface selected from at least one of the group consisting of said rim means, portions of said food package wall adjacent to said aperture means, portions of a protective covering of a food item, and portions of an uncovered food item.

2. The unit of claim 1 wherein the at least two segments is three segments, wherein each segment is colored differently from the other segments, the color of each segment is selected from the group consisting of red, yellow and blue such that substantial thawing of said medium will produce highly visible black, and wherein in a first step of the preparation of the unit, a first of said segments is entered into said containment means as a liquid and then frozen, in a second step of said preparation a second of said segments is entered into said containment means as a liquid on top of the first frozen segment and then frozen on top of said first frozen segment, and wherein, the equivalent of said second step is repeated to provide an additional juxtaposed segment, whereby each interface between juxtaposed segments will be of molecular thickness such that the slightest thaw of said segments will be evidenced by a color change at each said interface.

3. The unit of claim 2 wherein said medium comprises a linear, progressive array of the juxtaposed said segments of different colors progressing from red to yellow to blue such that partial thawing thereof will be evidenced by visible interface sections of orange and green colors.

4. The unit of claim 3 wherein the freezing point of said composition of each said segment is substantially identical to that of said composition of each other of said segments.

5. The unit of claim 4 wherein said segments are in rod shaped form.

6. A method for preparing a thaw indicator unit to be affixed to a food item or package, comprising providing at least two frozen segments of differently colored aqueous compositions in molecular contact with each other along an interface in an open container having a substantially transparent region overlying at least said interface and adjacent portions of said segments, while maintaining the frozen condition of said segments, hermetically sealing said container in a manner whereby said frozen segments are maintained in said molecular contact, and maintaining the frozen condition of said segments, throughout a period prior to affixation of said unit to said food item or to a package containing a food item, wherein in a first step of said preparation, a first of said segments is entered into said container as a liquid and then frozen, in a second step of said preparation a second of said segments is entered into said container as a liquid on top of the first frozen segment and then frozen on top of said first frozen segment, segments, whereby the interface between the segments will be of molecular thickness such that the slightest thaw of said segments will be evidenced by a color change at the interface.

7. The combination of a food item and a thaw indicator unit for sensing and permanently recording a thawing event experienced by said item, said unit comprising containment means of transparent, non-toxic material formed to provide a hermetically sealed chamber containing a frozen color change medium having at least two segments of differently colored frozen aqueous compositions juxtaposed along an interface, said interface being of molecular thickness, and at least one of said segments being substantially homogeneously colored differently from a juxtaposed one of said segments, wherein said segments are colored with food grade materials, and whereby said unit is positioned on, in or in close proximity to said item for recording any first thawing event by way of thawing of said juxtaposed segments and intermixing thereof at least at said interface to produce at least a visible section of an intermix of said aqueous compositions said visible section having a markedly different and readily visible color from that of said juxtaposed segments, receptacle means formed to provide cavity means for receiving and retaining said containment means, said receptacle means being adapted for insertion through aperture means formed through a food package wall or into said food item, said receptacle means having rim means adapted to bear against said food package wall or against said food item, and cover means of transparent material adapted to cover over said containment means and be secured to a surface selected from at least one of the group consisting of said rim means, portions of said food package wall adjacent to said aperture means, portions of a protective covering of said food item, and portions of an uncovered food item, and wherein in a first step of the preparation of the unit, a first of said segments is entered into said containment means as a liquid and then frozen, in a second step of said preparation a second of said segments is entered into said container as a liquid on top of the first frozen segment and then frozen on top of said first frozen segment, whereby the interface between juxtaposed segments will be of molecular thickness such that the slightest thaw of said segments will be evidenced by a color change at said interface.

8. The combination of claim 7 wherein one of said segments is differently colored from the other of said segments, the color of said one segment being selected from the group consisting of red, yellow and blue such that substantial thawing of said medium will produce highly visible black.

9. The combination of claim 7 wherein said at least two segments is three segments comprising a linear, progressive array of red to yellow to blue such that partial thawing thereof will be evidenced by visible interface sections of orange and green colors.

10. The combination of claim 9 wherein said segments are in rod shaped form.

11. The combination of claim 9 wherein said segments are in rectangular shaped form.

12. The combination of claim 7 wherein the freezing points of the compositions of said segments are substantially identical to each other.

\* \* \* \* \*